(12) United States Patent
Gubitz et al.

(10) Patent No.: US 8,527,554 B2
(45) Date of Patent: Sep. 3, 2013

(54) METADATA RETRIEVAL FOR MULTI-FUNCTION DEVICES

(75) Inventors: Erik Gubitz, Kenmore, WA (US);
Farhan Ahmed, Chicago, IL (US);
Abed Jawad, Kirkland, WA (US);
Aayaz Bhorania, Redmond, WA (US);
Palani Perumal, Redmond, WA (US);
Mitsuru Saito, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 574 days.

(21) Appl. No.: 12/002,055

(22) Filed: Dec. 14, 2007

(65) Prior Publication Data

US 2009/0157595 A1 Jun. 18, 2009

(51) Int. Cl.
*G06F 7/00* (2006.01)
*G06F 17/30* (2006.01)

(52) U.S. Cl.
USPC .......................................... 707/804; 707/736

(58) Field of Classification Search
None
See application file for complete search history.

(56) References Cited

U.S. PATENT DOCUMENTS

| | | | |
|---|---|---|---|
| 5,903,455 A | 5/1999 | Sharpe, Jr. et al. | |
| 6,076,106 A | 6/2000 | Hamner et al. | |
| 6,122,639 A | 9/2000 | Babu et al. | |
| 6,295,527 B1 | 9/2001 | McCormack et al. | |
| 6,470,332 B1 | 10/2002 | Weschler | |
| 6,574,662 B2 * | 6/2003 | Sugiyama et al. | 709/223 |
| 7,085,763 B2 | 8/2006 | Ochiai et al. | |
| 7,266,595 B1 | 9/2007 | Black et al. | |
| 7,302,448 B2 * | 11/2007 | Schwendiman et al. | 707/103 R |
| 2005/0015365 A1 * | 1/2005 | Kavacheri et al. | 707/3 |
| 2005/0169212 A1 * | 8/2005 | Doi et al. | 370/328 |
| 2006/0041581 A1 * | 2/2006 | Aghvami et al. | 707/102 |
| 2006/0130054 A1 * | 6/2006 | Bocking et al. | 717/173 |
| 2006/0230060 A1 * | 10/2006 | Salgado | 707/103 R |
| 2006/0245431 A1 | 11/2006 | Morris | |
| 2007/0055574 A1 | 3/2007 | Jensen et al. | |
| 2007/0130208 A1 | 6/2007 | Bornhoevd et al. | |
| 2008/0154611 A1 * | 6/2008 | Evermann et al. | 704/275 |
| 2008/0275854 A1 * | 11/2008 | Doi et al. | 707/3 |
| 2009/0055525 A1 * | 2/2009 | Slepov et al. | 709/224 |
| 2009/0300596 A1 * | 12/2009 | Tyhurst et al. | 717/173 |

OTHER PUBLICATIONS

Zune Privacy Supplement, http://privacy.microsoft.com/en-us/zune.aspx.
Windows Update, http://technet.microsoft.com/en-us/library/bb457101.aspx.
PNP-X Implementer's Guide, http://download.microsoft.com/download/5/D/6/5D6EAF2B-7DDF-476B-93DC-7CF0072878E6PnP-X_imp.doc.

* cited by examiner

*Primary Examiner* — Cheryl Lewis
*Assistant Examiner* — Raheem Hoffler
(74) *Attorney, Agent, or Firm* — Chin IP, PLLC; Davin Chin

(57) ABSTRACT

Systems and methods are provided for retrieving metadata relating to a multi-function device. In some embodiments, metadata is retrieved using a plurality of identifiers (e.g., hardware identifiers each identifying at least one function performed by the device) received from the device. The plurality of identifiers are arranged into a sequence, and at least one of the identifiers in the sequence is associated with metadata specifying a characteristic of the device. Using the metadata that is retrieved, a client computer may present an graphical user interface displaying information relating to the device.

20 Claims, 7 Drawing Sheets

METADATA RETRIEVAL FOR MULTI-FUNCTION DEVICES

FIELD OF THE INVENTION

This invention relates generally to computer software, and more particularly to software which enables a computer to interoperate with one or more peripheral devices.

BACKGROUND

Conventionally, when a peripheral device is connected to a client computer, the client computer receives information from the peripheral device that includes one or more "hardware identifiers." In general, each hardware identifier is used to identify a function performed by the peripheral device. If the peripheral device is a multi-function device, such as a printer/scanner/fax machine, the client computer may receive one or more hardware identifiers each identifying the print function, the scan function and the fax function. Once received, each hardware identifier is used by the client computer to identify a driver that enables the client computer to interoperate with, and employ the corresponding function provided by, the peripheral device.

More than one hardware identifier may be provided for each function, because there may be more than one driver which will allow the client computer to employ a particular function. For example, many device manufacturers typically supply multiple drivers for a given device function, with one driver being very specific to the function, and others being more generic. More generic drivers typically may be used by a client computer to employ functions provided by any of multiple devices (or families of devices), but may not allow the client computer to employ all of the aspects of a given device function. For example, the manufacturer of a monitor may include one driver that enables a client computer to employ all of the display functionality provided by the monitor, and several more generic drivers that do not enable the client computer to employ all of this functionality, but allow the client computer to interoperate with any of several monitors.

Typically, hardware identifiers for a given function are provided to a client computer in a sequence which ranges from most specific to most generic. That is, for each function performed by the device, the client computer receives a sequence ranging from the most specific hardware identifier to the most generic. If the device is a multi-function device, the hardware identifiers for each individual function conform to this sequence. Thus, if a device has two functions, and two hardware identifiers are provided by the device for each function, the client computer receives two groups of identifiers, each arranged in a sequence from most specific to most generic. Once the hardware identifiers are received by the client computer, it attempts to match hardware identifiers in each group in sequence with a driver (e.g., stored on the client computer). When a hardware identifier received from the device does not match a driver, the client computer proceeds with trying to match the next hardware identifier in the sequence in the group. Once a matching driver is found for a group, the client computer may employ the function represented by identifiers in the group.

This processing is illustrated conceptually in FIG. 1, in which device 101 is connected to client computer 102 via link 120. Device 101 includes hardware identifiers 105, which are provided to client computer 102 when device 101 is connected thereto, and are employed by matching facility 110 (which may be a portion of an operating system executing on client computer 102) to retrieve one or more drivers. Hardware identifiers 105 include identifiers for each of three different functions, with the first digit in each identifier following the letter "H" identifying the function. For example, hardware identifiers H11 and H12 correspond to a first function, H21, H22 and H23 correspond to a second function, and H31 corresponds to a third function. The identifiers for each function are arranged in a sequence from most specific to most generic, with the second digit in each identifier following the letter "H" identifying a level of specificity. Thus, hardware identifier H11 for the first function is more specific than is H12, and hardware identifier H22 for the second function is more specific than is H23.

When device 101 is connected to client computer 102, matching facility 110 receives the hardware identifiers for each function in sequence, and attempts to match each hardware identifier for a given function in turn to a driver stored in storage facility 115. For example, for hardware identifiers relating to the first function, matching facility 110 first attempts to match identifier H11 to a driver stored in storage element 115, and if no match is found, proceeds to try to match identifier H12. Similarly, matching facility 110 attempts to match identifiers for the second function (i.e., H21, H22 and H23) and for the third function (i.e., H31) to a driver in storage facility 115. When a matching driver is found for any function, client computer 102 employs the corresponding function as defined by the driver.

Because each hardware identifier provided by a peripheral device relates to a function performed by the device, rather than the device itself, a client computer that receives hardware identifiers corresponding to multiple functions (such as might be supplied by a multi-function device) "perceives" the device as multiple distinct entities (i.e., one entity for each function defined by a set of hardware identifiers). For example, when a multi-function device such as a printer/scanner/fax machine provides hardware identifiers for its functions to a client computer, the client computer perceives the device as three entities, providing print, scan and fax capabilities, respectively.

BRIEF SUMMARY OF THE INVENTION

Applicant has appreciated that the information provided by a peripheral device (i.e., any device attached to a client computer to provide functionality, such as a printer, disk drive, microphone, camera, cellular telephone, media player, microphone, etc.) to a client computer (a term used herein for convenience, and intended to include any computing device, such as a desktop computer, laptop computer, personal digital assistant, cellular telephone, other computing device, or any combination thereof) may be used to not only identify specific functions performed by the peripheral device, but also may identify the device itself to the client computer. Enabling the client computer to identify the device itself, rather than just its function(s), may allow the client computer to present an interface that displays information about the device and allows a user to configure the device rather than just its individual functions. As a result, the client computer can provide a richer and more meaningful user experience with respect to the device, such as by allowing the user to view information about the device and to manage relationships between individual functions. The user may interact with the device itself, rather than just separately configuring its individual functions.

In some embodiments, information provided by the device (e.g., one or more hardware identifiers) is used to retrieve metadata that includes various information about the device, such as one or more graphical illustrations of the device, the manufacturer's name, information about the device's features, and/or available user configuration tasks. The metadata may, for example, be employed by one or more software routines executing on a client computer to present an interface to the user that enables interaction with and/or configuration of the device and its functions.

Metadata may be stored on the client computer and/or one or more server computers. Some embodiments provide for a process whereby the client computer, upon receiving information from the device, first attempts to match the information to metadata stored on the client computer, and if the attempt is unsuccessful or the metadata is deficient (e.g., outdated or stale), the client computer passes the information to one or more server computers, which then attempt(s) to match the information to metadata accessible to the server computer(s). When a match is found, the metadata may be passed back to the client computer, which may use the information to present a user interface, and may update metadata stored locally.

DETAILED DESCRIPTION

Figure 1:
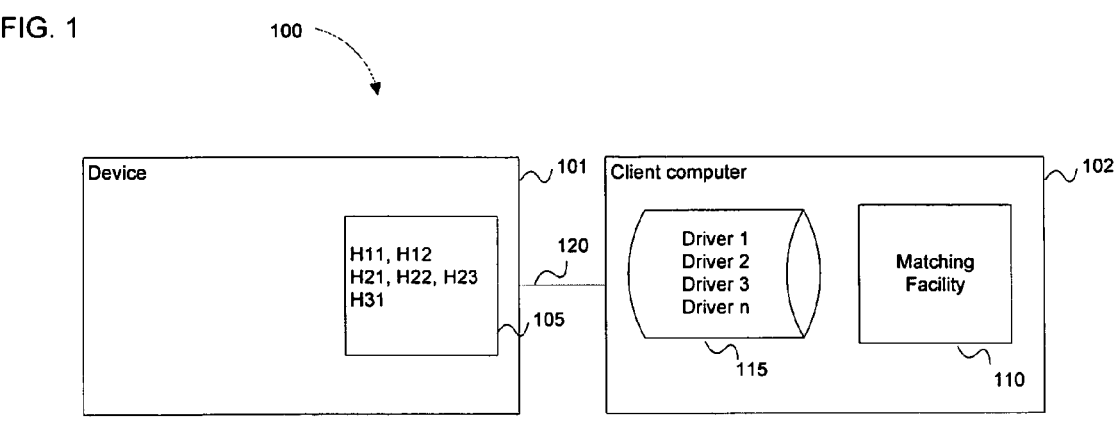
FIG. 1 is a block diagram depicting an example technique for matching hardware identifiers provided by a peripheral device to drivers on a client computer, according to the prior art.

In accordance with some embodiments of the invention, information received from a peripheral device, such as one or more hardware identifiers and/or other information, may be used to retrieve metadata which includes information about the device itself, rather than its individual function(s). The metadata may enable a client computer to provide the user with a richer and more meaningful experience in interacting with the device than is provided by conventional arrangements. For example, by identifying a multi-function device as a single entity, rather than as multiple separate entities each performing a separate function, a client computer may provide an interface which serves as a "single point of entry" for configuring the device and its various functions, allows the user to view and manage the relationships between individual functions, and/or visually identifies the device in a more precise and aesthetically pleasing manner than the function icons conventionally employed.

As an example, if a multi-function device provides cellular telephone, media player and personal productivity (e.g., address book) functions, the client computer may use information provided by metadata to provide a graphical user interface (e.g., via a "control panel" window, and/or any other suitable interface paradigm) which identifies the device, enables the user to configure its individual functions (e.g., synchronizing address book entries stored on the device with counterpart data on the client computer), and allows the user to configure features spanning multiple functions (e.g., by indicating that a particular media file should be played when a telephone call is received from a certain person). As a result, the user interacts with the device itself, rather than separately configuring its individual functions.

In some embodiments, metadata may be retrieved using information that is provided when the device is connected to a client computer. For example, a hardware identifier and/or other information provided to the client computer by the device may be used to retrieve metadata that includes various information about the device, such as a photograph and/or graphical illustration of the device, one or more available configuration tasks, the manufacturer's name, and/or any other suitable information. In some embodiments, some or all of these items of information may be processed by one or more software routines executing on the client computer to cause an interface to be presented enabling the user to configure and otherwise interact with the device and its functions.

Metadata may, for example, be provided by a manufacturer or supplier of the device, and may be stored on the client computer, one or more server computers coupled to the client computer via one or more networks, and/or any other suitable component. For example, in some embodiments, the client computer may attempt to use information provided by the device to retrieve metadata for the device by constructing and executing a query against a metadata storage facility residing on the client computer. If this attempt at retrieval is successful, items of information included in the metadata may be used to present an interface to a user of the client computer. If the retrieval attempt is unsuccessful, or if retrieved metadata is determined to be deficient in some way (e.g., outdated, incorrect, stale, etc.), the information and/or query may be communicated to one or more server computers for execution on one or more other metadata storage facilities. If metadata is successfully retrieved by a server computer, it may be provided to the client computer, which may employ it to present an interface to the user, and may employ it to update metadata stored on the client computer so that the metadata can subsequently be retrieved without requiring communication with a server computer. Of course, the invention is not limited to such a retrieval technique, and metadata may be retrieved in any suitable fashion. Some exemplary metadata retrieval techniques are described in the sections that follow.

Figure 2:
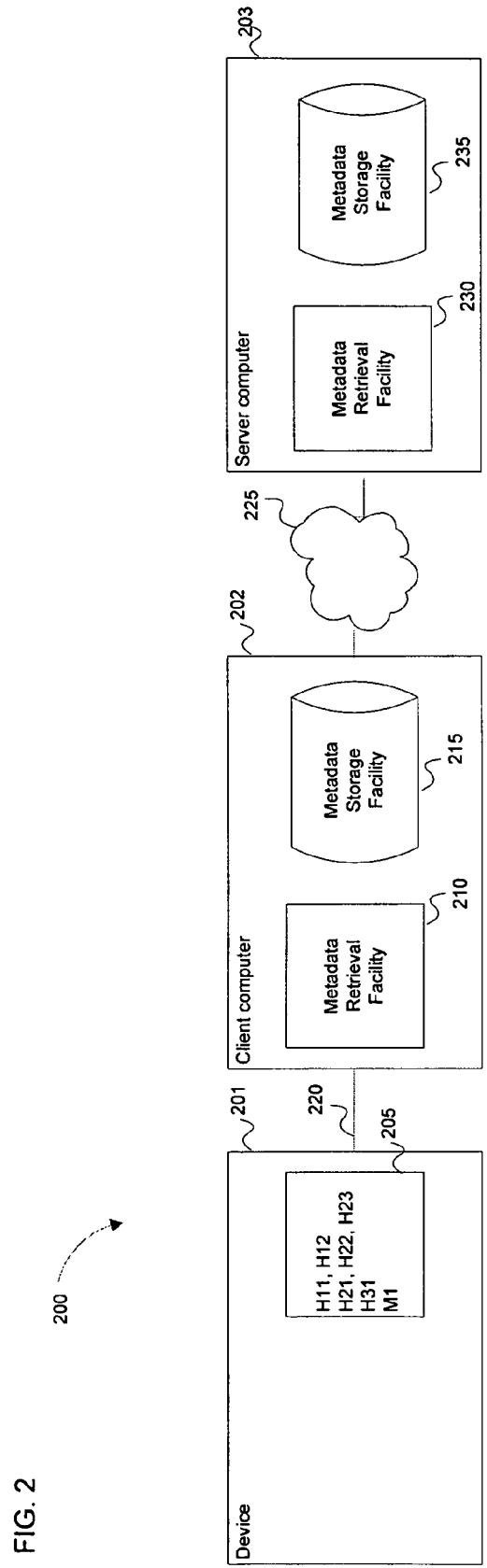
FIG. 2 is a block diagram depicting an example technique for matching hardware identifiers provided by a peripheral device with metadata about the device, according to some embodiments of the invention.

FIG. 2 depicts a system 200 which enables information provided by a device 201 to a client computer 202 to be used to retrieve metadata about the device. In the example of FIG. 2, device 201, which may be any suitable peripheral device providing one or more functions, stores information 205. Device 201 is connected to client computer 202 via link 220, which may comprise any suitable communications media, such as a Universal Serial Bus (USB) link. Client computer 202 executes metadata retrieval facility 210, which may comprise any one or more bodies of programmed instructions, such as stand-alone programs and/or modules, instructions incorporated into one or more other programs and/or modules (e.g., an operating system executing on client computer 202), or implemented in any other suitable fashion. Metadata retrieval facility 210 accesses metadata storage facility 215, which may comprise any one or more data structures.

In the example system 200, client computer 202 communicates with server computer 203 via network(s) 225, which may comprise, for example, the Internet, a LAN, a WAN and/or any other wired or wireless network, or combination thereof. It should be appreciated, however, that server computer 203 need not be a separate computer from client computer 201, and may, as an example, comprise programmed instructions which execute on client computer 201.

Metadata retrieval facility 230 executes on server computer 203 and accesses metadata storage facility 235. As with metadata retrieval facility 210, metadata retrieval facility may comprise any one or more bodies of programmed instructions implemented in any other suitable fashion. Similarly, like metadata storage facility 215, metadata storage facility 235 may comprise any one or more data structures. Metadata storage facility 215 and metadata storage facility 235 may include the same metadata, different metadata, or metadata which partially overlaps. The invention is not limited to any particular system implementation.

In the example system 200, information 205 includes the hardware identifiers described above with reference to FIG. 1 (i.e., identifiers H11, H12, H21, H22, H23 and H31), and an additional identifier M1 referred to herein for convenience as a model identifier. As described above, each hardware identifier corresponds to a particular function performed by device 201, and some hardware identifiers are more specific to device 201 than others. In some embodiments, model identifier M1 identifies the device 201 instead of one or more specific functions performed by the device. In some embodiments, a model identifier may be unique to a particular device, although the invention is not limited to such an implementation. For example, in some embodiments a model identifier may be unique to a device and provider, such that multiple providers may each provide a unique model identifier for the device. This may be useful for peripheral devices such as cellular telephones, where a single device may be offered for sale by multiple network service providers. Using a model identifier unique to a device and provider may allow each provider to furnish different metadata, which may be used to present different interfaces (e.g., to perform different configuration tasks, provide different information about the device, etc.).

As described above with reference to FIG. 1, the hardware identifiers included in information 205 are arranged so that the identifiers for each function that are more specific to the device (e.g., H11, H21) precede others that are more generic (e.g., H12, H22, H23). In accordance with some embodiments of the invention, hardware identifiers are further arranged so that a specific identifier and/or function which is deemed most representative of the device overall precedes all other identifiers and/or functions. For example, a device manufacturer may designate a specific hardware identifier (e.g., H11) to be used to retrieve metadata relating to the device. For example, if device 201 provides print, scan and fax functions, a manufacturer of the device may designate that identifier H11, representing the print function, should be used to retrieve metadata for device 201 overall, and may arrange the hardware identifiers so that identifier H11 precedes all others in information 205.

When device 201 is connected to client computer 202 via link 220, information 205 is provided to client computer 202, and more particularly to metadata retrieval facility 210, which accesses metadata storage facility 215. As noted above, the metadata in storage facility 215 may, for example, be provided by one or more device manufacturers or suppliers, such as the manufacturer or supplier of device 201, client computer 202, and/or any other device(s). For example, metadata may be installed when client computer 202 is configured for sale.

A manufacturer or supplier may also, or alternatively, make metadata available for distribution via one or more networks. Using the example system 200 shown to illustrate, a manufacturer/supplier may distribute metadata to client computer 202 via one or more networks (e.g., the Internet, other network(s), or a combination thereof). Upon receiving newly distributed metadata, client computer 202 may load it to metadata storage facility 215 Metadata may be distributed, for example, at periodic intervals, and/or upon any other occurrence. An example process for distributing metadata via one or more networks is described in further detail below with reference to FIG. 5. Of course, metadata may be provided and/or loaded to storage facility 215 in any suitable fashion, as embodiments of the invention are not limited in this respect.

In some embodiments, system 200 enables a metadata retrieval process which includes an initial retrieval attempt by client computer 202 (and more particularly, by metadata retrieval facility 210), and if no match is found or if retrieved metadata is determined to be deficient in some way, an additional retrieval attempt may be made by server computer 203 (and more particularly, metadata retrieval facility 230). For example, metadata retrieval facility 210 may construct a query using information provided by device 210, and if the retrieval attempt is unsuccessful, may pass the query or parameters used therein via network(s) 225 to metadata retrieval facility 230, which may construct and/or execute a query to retrieve metadata from storage facility 235. This two-step retrieval process is also described in further detail below with reference to FIG. 5.

Figure 3:
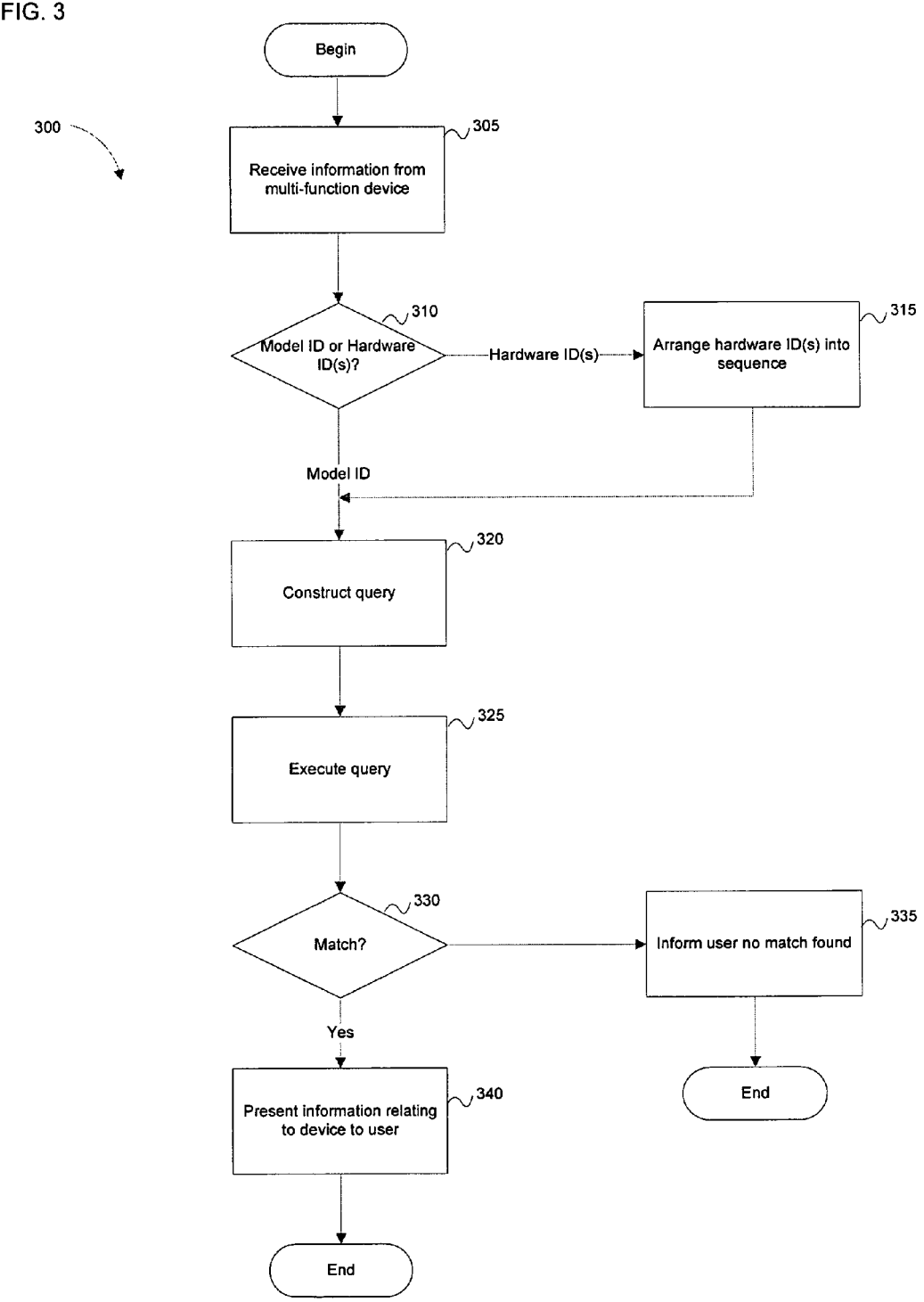
FIG. 3 is a flowchart depicting an example process for identifying metadata relating to a peripheral device using information provided by the device, according to some embodiments of the invention.

FIG. 3 depicts an example process 300 performed by a client computer (e.g., client computer 202) to retrieve metadata for a device using information provided by the device. At the start of process 300, information is received from the device in act 305. Information may be provided to the client computer via any one or more direct links (e.g., a USB, FireWire or other link), networks (e.g., a wired or wireless network, such as an ad hoc network between a device and client computer), or other connections. The invention is not limited to any particular implementation.

In act 310, the client computer (e.g., a metadata retrieval facility executing thereon) determines whether the information received from the device includes a model identifier or one or more hardware identifiers. This determination may be made in any suitable fashion, such as by executing programmed instructions to identify any model identifier or hardware identifier(s) from among information received from the device.

If it is determined in act 310 that the information includes one or more hardware identifiers, the process proceeds to act 315, wherein the hardware identifier(s) are arranged into a sequence. One exemplary manner of arranging hardware identifiers into a sequence is illustrated conceptually in FIG. 4.

Figure 4:
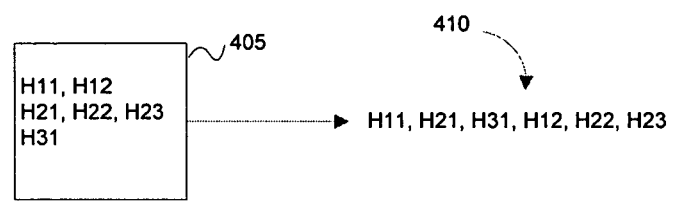
FIG. 4 is a block diagram illustrating a technique for arranging information received from a peripheral device into a sequence, according to some embodiments of the invention.

In the example of FIG. 4, hardware identifiers 405, which include identifiers the H11, H12, H21, H22, H23 and H31 described above with reference to FIG. 1, are arranged into a sequence such that identifiers that are most specific to the device for any function precede other identifiers that are more generic. Thus, in this example, hardware identifiers are arranged into the sequence H11, H21, H31, H12, H22, H23. However, it should be appreciated that hardware identifiers, or other information received from a device, may be arranged into any suitable sequence, and that embodiments of the invention are not limited to any particular implementation.

Upon the completion of act 315, or if it is determined in act 310 that the information received from the multi-function device comprises a model identifier, process 300 proceeds to act 320, wherein a query employing the information is constructed. In some embodiments, the query specifies a query type (e.g., whether a model identifier or one or more hardware identifiers are specified in the query), a locale (e.g., the location of the client computer, which may be used to determine the language in which metadata should be provided), either the model identifier or hardware identifier(s) received from the device, and a stamp date indicating when metadata stored on the client computer was last updated. Thus, in some embodiments, a query resulting from act 320 may be:

type=hwid, lang=en-us, hwids=H11, H21, H31, H12, H22, H23, LastStampDate=20070801

After the query is constructed in act 320, process 300 proceeds to act 325, wherein the query is executed. For example, in some embodiments, a metadata retrieval facility (e.g., facility 210, FIG. 2) on the client computer may execute the query by attempting to match the model identifier or hardware identifier(s) provided in the query with metadata stored on the client computer (e.g., in metadata storage facility 215). If more than one hardware identifier is specified in the query, the metadata retrieval facility may attempt to match each hardware identifier in sequence to metadata, so as to attempt to retrieve metadata that is most specific to the device.

The process then proceeds to act 330, where a determination is made whether a match has been found. In some embodiments, only one matching item of metadata is retrieved. For example, assume that the metadata stored in metadata storage facility includes the following two items:

Metadata A:
Function=mf
Match1=h11
Match2=h782
Lang=en-us
LastStampDate=20070811
Metadata B:
Function=mf
Match1=h31
Lang=en-us
LastStampDate=20070815

In this example, because the metadata retrieval facility attempts to match each hardware identifier in sequence to metadata items, even though both items of metadata include hardware identifiers listed in the query (i.e., identifiers H11 and H31), metadata A is determined to be the matching item.

If no match is found, the process proceeds to act 335, wherein the user is informed of this, and process 300 ends (an alternative embodiment wherein the lack of a match does not lead to the end of the process is described below with reference to FIG. 5).

If a match is found, the metadata that is retrieved may be processed by one of more software routines, such as to present an interface to a user of client computer 202 in act 340. For example, this interface may present information about the device, and one or more available tasks which the user may undertake to configure the device. At the completion of act 340, process 300 ends.

It should be appreciated that any of numerous techniques may be employed to retrieve metadata, and that embodiments of the invention are not limited to using process 300. Further, a technique used to retrieve metadata may include one or more acts not described above with reference to FIG. 3, may not include all of the acts described above, and need not perform the acts described above in the sequence described above. Any of numerous variations on process 300 may be employed, as the invention is not limited to any particular implementation.

Figure 5:
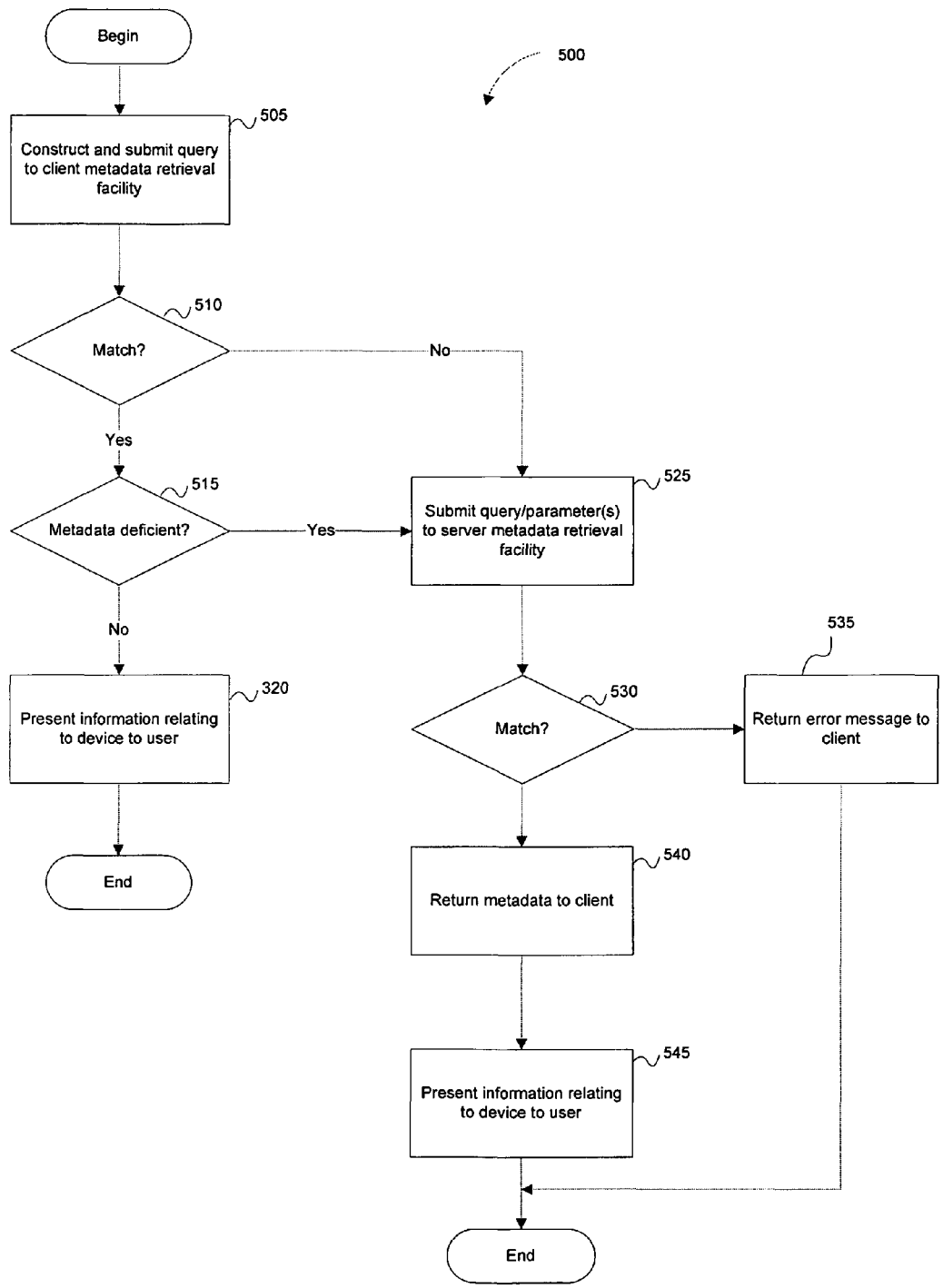
FIG. 5 is a flowchart depicting an example process for identifying metadata about a device using information provided by the device, according to some embodiments of the invention.

FIG. 5 depicts an example process whereby a client computer coupled to a server computer may retrieve metadata relating to a device. In particular, FIG. 5 depicts a two-step retrieval process wherein a first retrieval attempt is made by a client computer (e.g., client computer 202, FIG. 2), and if no matching metadata is found or if retrieved metadata is deficient (e.g., outdated, stale, etc.), an additional retrieval attempt is made by a server computer (e.g., server computer 203). If the additional retrieval attempt is successful, the metadata retrieved by the server computer may be used to update the metadata stored on the client computer, so that subsequent retrieval attempts by the client computer may succeed.

At the start of process 500, a query is constructed and executed by a client computer (e.g., by a metadata retrieval facility executing thereon) in act 505. This may, for example, be performed in much the same manner as in acts 320 and 325, described above with reference to FIG. 3. Of course, the invention is not limited to such an implementation, as a query may be constructed and executed in any suitable fashion.

At the completion of act 505, the process proceeds to act 510, wherein a determination is made whether a match has been found. This may, for example, be performed in much the same manner as in acts 330, described above with reference to FIG. 3, or in any other suitable fashion.

If it is determined that a match has been found, process 500 proceeds to act 515, wherein a determination is made whether the matching metadata is deficient. For example, a metadata retrieval facility executing on the client computer may determine whether matching metadata is outdated. This determination may, for example, be made using an indication of the date and time at which the metadata was last updated, such as the date-time stamp described above. For example, if the metadata is older than a predetermined age (e.g., one month), it may be determined that the metadata is outdated. Of course, being outdated is only one exemplary way in which metadata may be deficient. Any suitable criteria may be used to identify any suitable deficiency or lack thereof, and embodiments of the invention are not limited in this respect.

If it is determined in act 515 that the metadata is deficient, or if it is determined in act 510 that no match has been found, process 500 proceeds to act 525, wherein the query constructed in act 505, or one or more parameters defined thereby, is submitted to and executed by a metadata retrieval facility executing on the server computer (e.g., server computer 203, FIG. 2). The query/parameter(s) may be transmitted to, and executed by, the server computer in any suitable fashion, as embodiments of the invention are not limited in this respect. For example, the query/parameter(s) may be transmitted via network(s) 225 (FIG. 2) and executed by the server computer in much the same fashion as was described above with reference to act 325 in FIG. 3.

The process then proceeds to act 530, where it is determined whether a match is found among metadata accessible to the server computer. If no match is found, an error message is returned to the client in act 535, so that, for example, it may be displayed to the user of the client computer. If a match is found, the process proceeds to act 540, wherein the metadata is returned to the client (e.g., transmitted by server computer 203 via networks 225 to client computer 202). The process then proceeds to act 545, wherein information relating to the device is presented to the user. Upon the completion of either of acts 535 or 545, process 500 completes.

Figure 6:
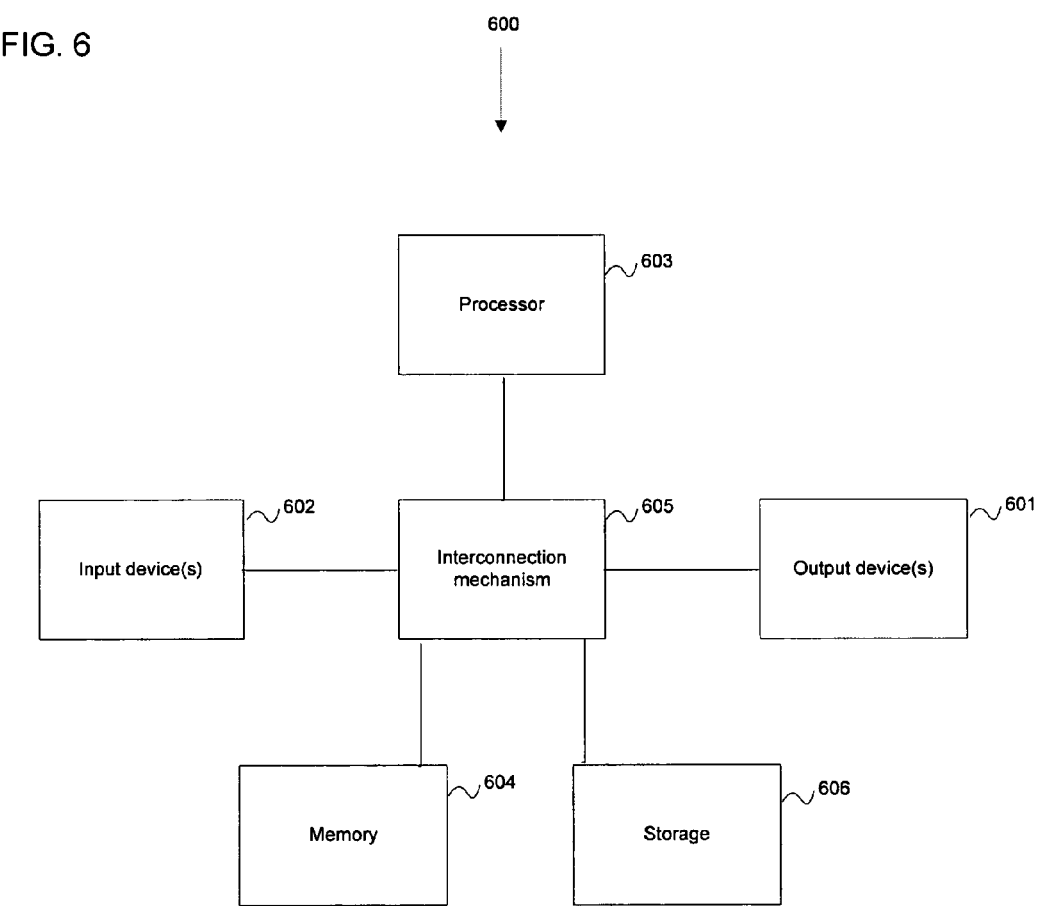
FIG. 6 is a block diagram depicting an example computer system on which some embodiments of the invention may be implemented.

Various aspects of the systems and methods for practicing features of the invention may be implemented on one or more computer systems, such as the exemplary computer system 600 shown in FIG. 6. Computer system 600 includes input device(s) 602, output device(s) 601, processor 603, memory system 604 and storage 606, all of which are coupled, directly or indirectly, via interconnection mechanism 605, which may comprise one or more buses, switches, networks and/or any other suitable interconnection. The input device(s) 602 receive(s) input from a user or machine (e.g., a human operator), and the output device(s) 601 display(s) or transmit(s) information to a user or machine (e.g., a liquid crystal display). The processor 603 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

The processor 603 may also execute one or more computer programs to implement various functions. These computer programs may be written in any type of computer program language, including a procedural programming language, object-oriented programming language, macro language, or combination thereof. These computer programs may be stored in storage system 606. Storage system 606 may hold information on a volatile or non-volatile medium, and may be fixed or removable. Storage system 606 is shown in greater detail in FIG. 7.

Figure 7:
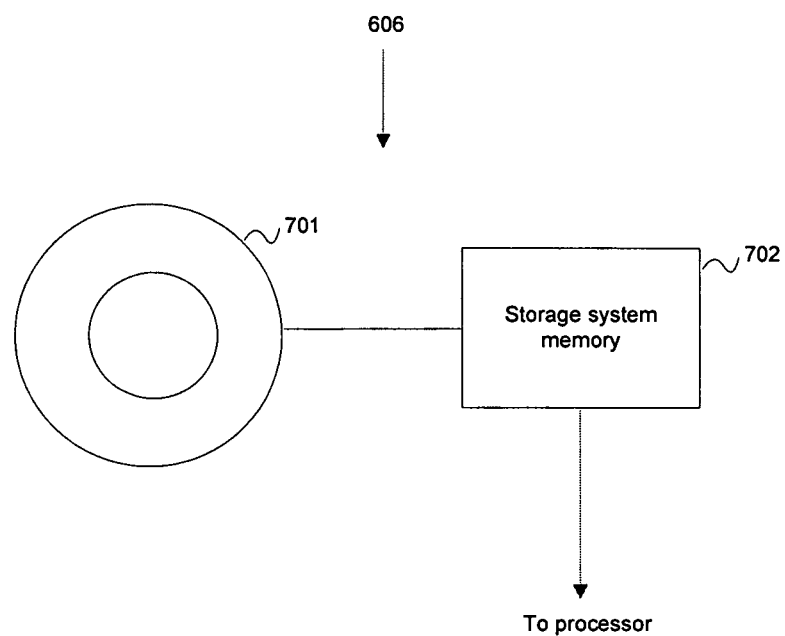
FIG. 7 is a block diagram depicting an example memory on which instructions embodying aspects of the present invention may be stored.

Storage system 606 typically includes a computer-readable and writable nonvolatile recording medium 701, on which signals are stored that define a computer program or information to be used by the program. A medium may, for example, be a disk or flash memory. Typically, an operation, the processor 603 causes data to be read from the nonvolatile recording medium 701 into a volatile memory 702 (e.g., a random access memory, or RAM) that allows for faster access to the information by the processor 603 than does the medium 701. The memory 702 may be located in the storage system 606, as shown in FIG. 7, or in memory system 604, as shown in FIG. 6. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is also not limited to a particular memory system 604 or storage system 606.

Having thus described several aspects of at least one embodiment of this invention, it is to be appreciated that various alterations, modifications, and improvements will readily occur to those skilled in the art. Such alterations, modifications and improvements are intended to be part of this disclosure, and are intended to be within the spirit and scope of the invention. Accordingly, the forgoing description and drawings are by way of example only.

Further, it should be appreciated that a (client or server) computer may be embodied in any of a number of forms, such as a rack-mounted computer, a desktop computer, a laptop computer, or a tablet computer. Additionally, a (client or server) computer may be embedded in a device not generally regarded as a computer but with suitable processing capabilities, including a Personal Digital Assistant (PDA), a smart phone or any other suitable portable or fixed electronic device.

Also, a (client or server) computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms.

Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy disks, compact disks, optical disks, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be provided in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of identifying functionalities performed by peripheral devices, comprising:
   receiving, by a computing device, information from a first peripheral device;
   determining, by the computing device, that the information from the first peripheral device comprises a plurality of functionality identifiers, wherein each of the functionality identifiers identifies at least one of a plurality of functions that the first peripheral device is capable of performing;
   arranging, by the computing device, the plurality of functionality identifiers into a sequence that is ordered according to levels of specificity of the functions identified by each of the functionality identifiers;
   comparing, by the computing device, one or more functionality identifiers of the arranged sequence to metadata that specifies a characteristic of the first peripheral device other than the functions identified by the one or more functionality identifiers;
   identifying, by the computing device, an association between at least one of the one or more functionality identifiers and the metadata;
   causing, by the computing device, information corresponding to the metadata to be displayed;
   receiving, by the computing device, information from a second peripheral device;
   determining, by the computing device, that the information from the second peripheral device comprises an identity of a model of the second peripheral device;
   associating the identity of the model with other metadata that specifies at least one characteristic of the second peripheral device other than functions that the second peripheral device is capable of performing; and
   causing information corresponding to the other metadata to be displayed.

2. The method of claim 1, wherein at least one of the functionality identifiers is assigned by a manufacturer of the first peripheral device.

3. The method of claim 1, wherein further comparing the one or more functionality identifiers of the arranged sequence to metadata comprises:
   determining, by the computing device, a deficiency in locally available metadata corresponding to at least one functionality identifier of the arranged sequence.

4. The method of claim 3, wherein comparing the one or more functionality identifiers of the arranged sequence to metadata further comprises:
   transmitting, by the computing device, the at least one functionality identifier to a server computer for comparison with server-stored metadata stored on the server computer; and
   receiving, by the computing device, at least a portion of the server-stored metadata from the server computer.

5. The method of claim 1, wherein comparing the one or more functionality identifiers of the arranged sequence to metadata comprises:
   sequentially comparing to the one or more functionality identifiers to the metadata.

6. The method of claim 1, wherein the metadata specifies at least one task relating to configuring the first peripheral device and/or to at least one function that the first peripheral device is capable of performing.

7. The method of claim 1, wherein the sequence is ordered such that the sequence begins with a most specific of the functionality identifiers and ends with a least specific of the functionality identifiers.

8. At least one tangible computer-readable storage medium article having instructions stored thereon for causing a client computer to interface with peripheral devices that are operable to perform a plurality of functions, the instructions for executing operations comprising:
   receiving, by the client computer, information from a first peripheral device;
   determining, by the client computer, that the information from the first peripheral device comprises a plurality of functionality identifiers, wherein each of the functionality identifiers identifies at least one of a plurality of functions that the first peripheral device is operable to perform;
   arranging, by the client computer, the plurality of functionality identifiers into a sequence that is ordered such that the sequence begins with a most specific of the functionality identifiers and ends with a least specific of the functionality identifiers, wherein each of the plurality of functionality identifiers corresponds to at least one of the plurality of functions that the first peripheral device is operable to perform;
   comparing, by the client computer, one or more functionality identifiers of the arranged sequence to metadata that specifies a characteristic of the first peripheral device other than the functions identified by the one or more functionality identifiers;
   identifying, by the client computer, an association between at least one of the one or more functionality identifiers and the metadata;
   causing, by the client computer, information corresponding to the metadata to be displayed;
   receiving, by the client computer, information from a second peripheral device;
   determining, by the client computer, that the information from the second peripheral device comprises an identity of a model of the second peripheral device;
   associating the identity of the model with other metadata that specifies at least one characteristic of the second peripheral device other than the functions that the second peripheral device is operable to perform, wherein the other metadata is partially stored by the client computer and is partially stored by another computer; and
   causing, by the client computer, information corresponding to the other metadata to be displayed.

9. The at least one tangible computer-readable storage medium article of claim 8, wherein the information from the second peripheral device further comprises an experience identifier.

10. The at least one tangible computer-readable storage medium article of claim 8, wherein the metadata and/or the other metadata specifies a manufacturer of the first and/or second peripheral device, at least one task relating to configuring the first and/or second peripheral device, and/or at least one function that the first and/or second peripheral device is operable to perform.

11. The at least one tangible computer-readable storage medium article of claim 8, wherein comparing the one or more functionality identifiers of the arranged sequence to metadata further comprises:
    transmitting, by the client computer, the at least one functionality identifier to the other computer for comparison with the portion of metadata that is stored on the other computer; and
    receiving, by the client computer, at least a portion of the metadata stored on the other computer.

12. A computing device, comprising:
    a memory and at least one processor that are respectively configured to store and execute instructions that:
        receive information from a first peripheral device;
        determine that the information from the first peripheral device includes a plurality of functionality identifiers that respectively correspond to functions that the first peripheral device is configured to perform;
        arrange the plurality of functionality identifiers into a sequence that is based on the respective specificities of each of the plurality of functionality identifiers;
        compare at least some of the functionality identifiers, in accordance with the sequence, to metadata that specifies at least one characteristic of the first peripheral device; and that
        identify an association between one of the at least some of the functionality identifiers and the metadata.

13. The computing device of claim 12, further comprising a storage element configured to store the metadata.

14. The computing device of claim 12, wherein the metadata corresponds to at least one configuration task for the first peripheral device and/or at least one function that the first peripheral device is configured to perform.

15. The computing device of claim 12, wherein the computing device is in networked communication with a server device, and wherein the memory and the at least one processor are further configured to store and execute instructions that:
    transmit at least one of the functionality identifiers to the server device for comparison with other metadata that is accessible to the server device; and that
    receive at least a portion of the other metadata.

16. The computing device of claim 12, wherein the memory and the at least one processor are further configured to respectively store and execute instructions that:
    cause information relating to at least one task for configuring the first peripheral device to be displayed.

17. The computing device of claim 12, wherein the memory and the at least one processor are further configured to respectively store and execute instructions that:
    cause information relating to configuring the computing device to interoperate with the first peripheral device to be displayed.

18. The computing device of claim 12, wherein the memory and the at least one processor are further configured to respectively store and execute instructions that:
    receive information from a second peripheral device;
    determine that the information received from the second peripheral device includes a model identifier of the second peripheral device; and
    associate the model identifier with model specific metadata that specifies at least one characteristic of the second peripheral device.

19. The computing device of claim 18, wherein the memory and the at least one processor are further configured to respectively store and execute instructions that:
    cause information corresponding to the model specific metadata to be presented by the computing device.

20. The computing device of claim 12, wherein the sequence is ordered such that the sequence begins with a most specific of the functionality identifiers that identifies a most specific of the functions and ends with a least specific of the functionality identifiers that identifies a least specific of the functions.

* * * * *